(12) United States Patent
Sato (10) Patent No.: US 7,620,278 B2
(45) Date of Patent: Nov. 17, 2009

(54) OPTICAL WAVEGUIDE DEVICE

(75) Inventor: Koki Sato, Sagamihara (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 0 days.

(21) Appl. No.: 12/138,635

(22) Filed: Jun. 13, 2008

(65) Prior Publication Data

US 2008/0317412 A1 Dec. 25, 2008

(30) Foreign Application Priority Data

Jun. 20, 2007 (JP) .............................. 2007-162624

(51) Int. Cl.
*G02B 6/12* (2006.01)
*G02B 6/26* (2006.01)
(52) U.S. Cl. .............................. 385/50; 385/14; 385/52
(58) Field of Classification Search ........................ None
See application file for complete search history.

(56) References Cited

U.S. PATENT DOCUMENTS

| | | | | |
|---|---|---|---|---|
| 5,343,544 A * | 8/1994 | Boyd et al. | .................... | 385/46 |
| 5,784,509 A * | 7/1998 | Yamane et al. | ................. | 385/49 |
| 7,373,053 B2 * | 5/2008 | Takahashi et al. | ............. | 385/52 |
| 2005/0254770 A1 * | 11/2005 | Watanabe | .................... | 385/137 |

FOREIGN PATENT DOCUMENTS

| | | |
|---|---|---|
| JP | 2002-139641 A | 5/2002 |
| JP | 2004-093730 A | 3/2004 |
| JP | 2004-212686 A | 7/2004 |
| JP | 2005-352453 A | 12/2005 |

* cited by examiner

*Primary Examiner*—Omar Rojas
(74) *Attorney, Agent, or Firm*—Frishauf, Holtz, Goodman & Chick, P.C.

(57) ABSTRACT

An optical waveguide device, including: a substrate including an optical waveguide and a connecting section formed on at least one end of the optical waveguide; an optical fiber placed in the connecting section and optically connected to the optical waveguide; and a fixing member to nip the optical fiber between the connecting section and the fixing member; wherein on the substrate, a groove is formed between the optical waveguide and the connecting section; and the fixing member is provided across the groove.

10 Claims, 8 Drawing Sheets

OPTICAL WAVEGUIDE DEVICE

BACKGROUND OF THE INVENTION

1. Field of the Invention

The present invention relates to an optical waveguide device connected to an optical cable.

2. Description of Related Art

In recent years, with the increase in speed of data communication, optical communication using optical cables is replacing communication using metallic cables and becoming the main stream. As an optical waveguide device which performs optical communication, there is an optical waveguide device optically connected to an optical cable and the device splits the light transmitted from the optical cable into a plurality of optical cables.

An optical waveguide device comprises an optical waveguide section including a core formed with a plurality of branches in a Y-shape and a clad formed so as to enwrap the core, and a connecting section to fix optical fiber lines and to connect the optical fiber lines to both ends of the core, and the optical waveguide section and the connecting section are both formed on the same substrate.

As for the connection between the optical waveguide device and the optical fiber, it is important that accurate alignment is performed so that loss at a connection point is small and that the connection is fixed so that the connection is not misaligned even when a certain amount of external force is applied.

Thus, a structure in which a V-shaped groove (V-groove) is provided in the connecting section to place an optical fiber line to enable accurate alignment when the optical fiber line is fixed is proposed (for example, see Japanese Patent Application Laid-Open Publication No. 2004-93730, Japanese Patent Application Laid-Open Publication No. 2005-352453).

Figure 10A:
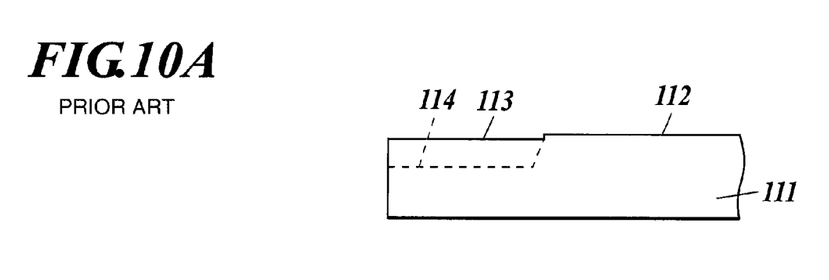
FIG. 10A to 10C are side views showing methods of fabricating an optical waveguide device.
Figure 10B:
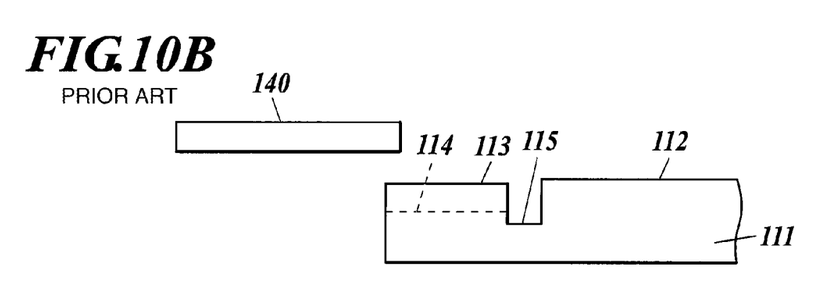

As shown in FIG. 10A, when a V-groove 114 with a depth of about 100 μm is formed by anisotropic wet etching in a connecting section 113 of a substrate 111, an end face is not flat. Thus, as shown in FIG. 10B, by forming a rectangular groove 115 at a border between an optical waveguide section 112 and the connecting section 113 orthogonal to the V-groove 114 by dicing, and as shown in FIG. 10C, abutting an optical fiber line 140 to a side wall of the rectangular groove 115 on the optical waveguide section 112 side, accurate alignment may be performed (for example, see Japanese Patent Application Laid-Open Publication No. 2002-139641) As a core and a clad of the optical waveguide section 112, polymer material such as polyimide, etc., may be used, and as a substrate 111, a silicon substrate may be used.

Figure 10C:
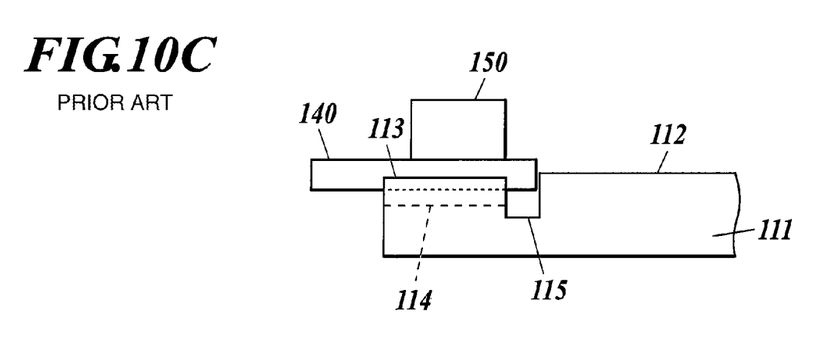

As shown in FIG. 10C, the optical fiber line 140 is fixed to the connecting section by placing a glass block 150 on the optical fiber line 140 placed on the connecting section 113 and injecting an adhesive between the connecting section 113 and the glass block 150 while pushing the glass block 150 to the connecting section 113 with a jig (not shown) (for example, see Japanese Patent Application Laid-Open Publication No. 2004-212686).

A gap between the optical fiber line and the core of the optical waveguide section is filled with a transparent UV curable resin with a refractive index equal to that of the core in order to prevent Fresnel reflection loss caused by the air gap.

However, there is a problem that when UV curable resin is supplied more than necessary, the UV curable resin flows into the rectangular groove, and thus when the UV curable resin cures and contracts, the end of the optical fiber line moves causing deterioration of alignment accuracy.

SUMMARY OF THE INVENTION

It is, therefore, a main object of the present invention to provide an optical waveguide device to maintain alignment accuracy of an optical fiber line.

According to an aspect of the present invention, there is provided an optical waveguide device, comprising:

a substrate including an optical waveguide and a connecting section formed on at least one end of the optical waveguide;

an optical fiber placed in the connecting section and optically connected to the optical waveguide; and a fixing member to nip the optical fiber between the connecting section and the fixing member; wherein on the substrate, a groove is formed between the optical waveguide and the connecting section; and the fixing member is provided across the groove.

Preferably, in the optical waveguide device, the optical fiber is bonded to the fixing member above the groove by an adhesive.

Preferably, in the optical waveguide device, the adhesive to bond the optical fiber and the fixing member is injected from a gap between the optical waveguide and the fixing member.

Preferably, in the optical waveguide device, the adhesive is filled in a gap between the optical fiber and the optical waveguide, and optically connects the core of the optical fiber and the core of the optical waveguide.

Preferably, in the optical waveguide device, the adhesive has a viscosity of 1000 CP or less.

Preferably, in the optical waveguide device, the fixing member and the connecting section are bonded with a reinforcement adhesive with a higher viscosity than the adhesive.

Preferably, in the optical waveguide device, in the connecting section, an alignment groove is provided to place the optical fiber in a position to optically connect to the optical waveguide, and a fixing groove into which the reinforcement adhesive flows is provided parallel to the alignment groove.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein.

DESCRIPTION OF THE PREFERRED EMBODIMENTS

The best mode for carrying out the optical waveguide device according to the present invention will be explained in detail with reference to the drawings.

<Optical Waveguide Device>

Figure 1:
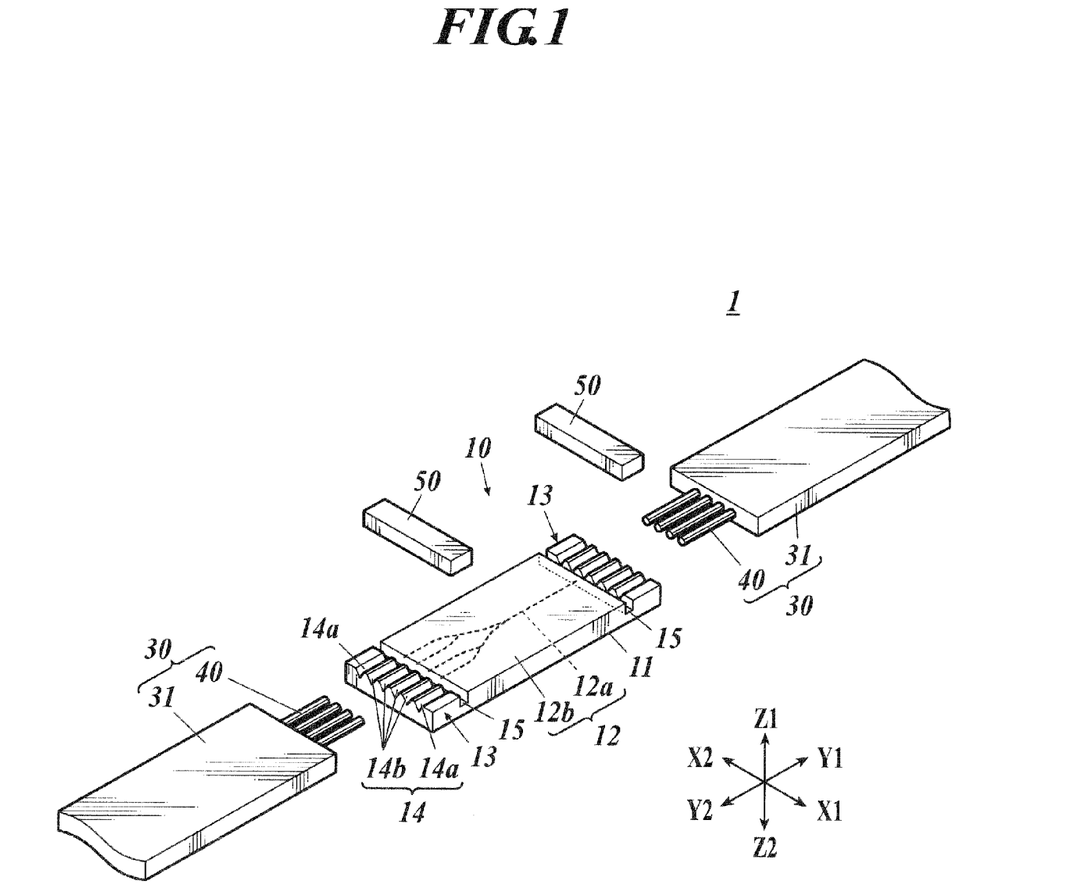
FIG. 1 is an exploded perspective view showing an optical waveguide device 1 of the embodiment.

FIG. 1 is an exploded perspective view showing an optical waveguide device 1 of the embodiment. The optical waveguide device 1 schematically comprises an optical waveguide chip 10, fiber ribbon 30, glass block 50 and the like.

The optical waveguide chip 10 includes an optical waveguide section 12 formed on a substrate 11 and a connecting section 13 for optically connecting optical fiber lines 40 in a fiber ribbon 30 to the optical waveguide section 12. As the substrate 11, for example, a silicon substrate and the like may be used.

On a substrate face in a Z1 direction of the substrate 11, the optical waveguide section 12 include cores 12a formed with a plurality of branches in a Y shape and clad 12b for enwrapping the cores 12a and the optical waveguide section 12 splits light input from a Y1 direction shown in FIG. 1. On the contrary, light input from a Y2 direction may be intensified.

Polymer material such as polyimide, etc., may be used in the core 12a and the clad 12b.

Figure 2:
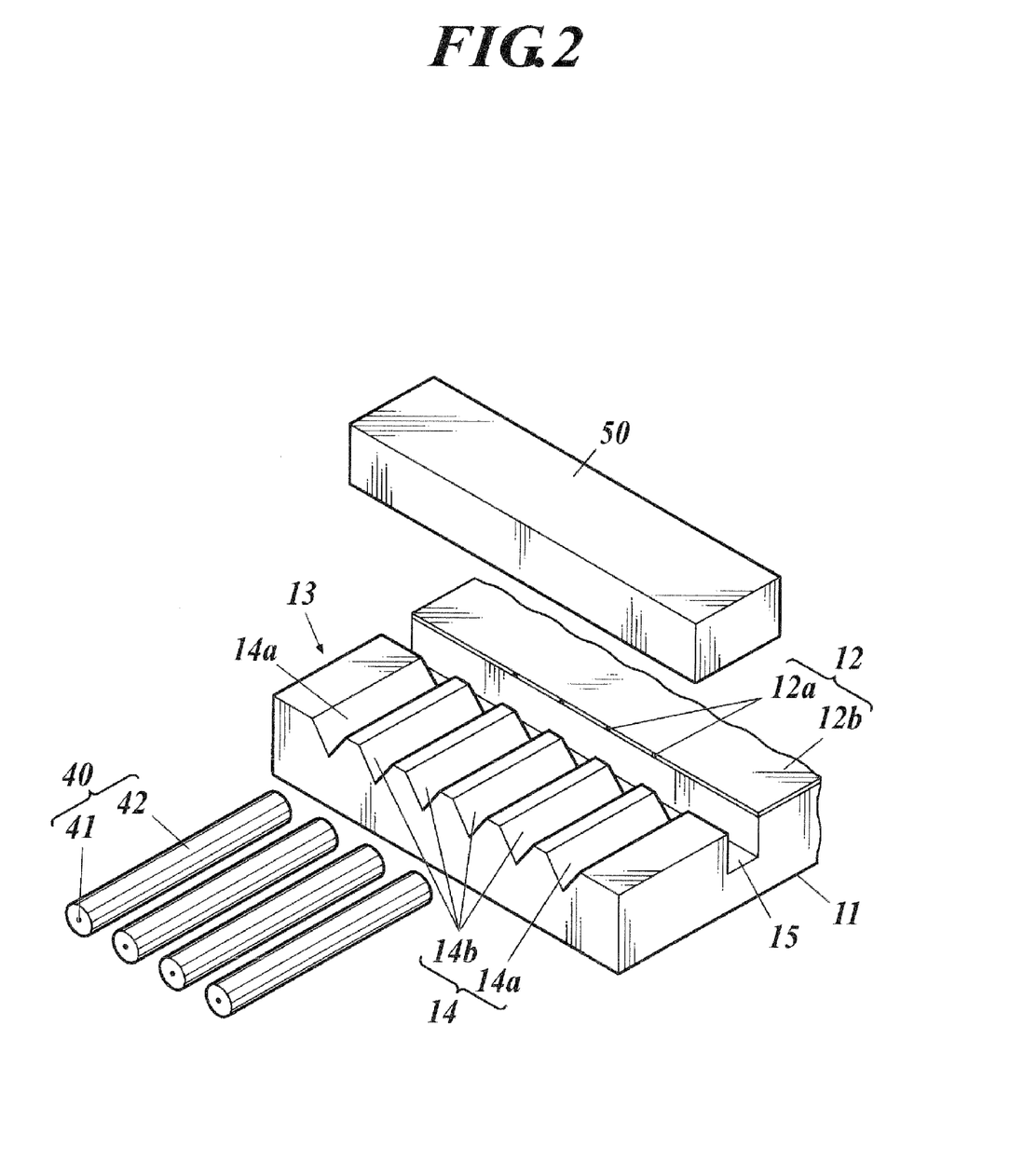
FIG. 2 is an enlarged view of the connecting section 13 shown in FIG. 1.

FIG. 2 is an enlarged view of the connecting section 13 shown in FIG. 1. As shown in FIG. 1 and FIG. 2, the connecting section 13 is formed on the substrate face in the Z1 direction of the substrate 11, where V-grooves 14 with a V-shaped cross section are formed along the light transmission direction of the core 12a (Y1-Y2 direction). The V-grooves 14 are formed in pre-designed positions according to a diameter of the optical fiber lines 40 where cores 41 of the optical fiber lines 40 match positions of the cores 12a of the optical waveguide section 12 so that the optical fiber lines 40 of the fiber ribbon 30 can fit.

The number of the V-grooves is at least two more than the number of the optical fiber lines 40 described below, and FIG. 1 and FIG. 2 show two more V-grooves than the number of optical fiber lines 40. As described below, the V-grooves 14 on both sides are to be fixing grooves 14a which reinforcement adhesive 70 flows in and act as spaces for adhesion. The other V-grooves 14 are to be alignment grooves 14b for defining a fixing position of the optical fiber lines 40. By placing the optical fiber lines 40 in the alignment grooves 14b, the cores 41 of the optical fiber lines 40 are placed in the Y1-Y2 direction.

In a border section between the connecting section 13 and the optical waveguide section 12, a rectangular groove 15 deeper than the V-grooves 14 is formed in a direction orthogonal to the direction the V-grooves 14 are formed (X1-X2 direction) The cores 12a are exposed from the side wall of the rectangular groove 15 on the optical waveguide section 12 side. As described below, the end faces of the optical fiber lines 40 placed in the V-grooves 14 abut the side wall of the rectangular groove 15 on the optical waveguide section 12 side.

The fiber ribbon 30 connected to the connecting section 13 includes multiple or single optical fiber line(s) 40 inside its cover 31 and the optical fiber line(s) 40 is exposed from the end area to be connected to the connecting section 13. The optical fiber line 40 is formed by, for example, elongating a preform, which is silica glass doped with germania (GeO2) and the like, into a cylindrical shape, and at a center of the cylindrical shape the core 41 is extended with being enwrapped by a clad 42. The optical fiber line 40 may be a multicomponent glass or plastic optical fiber (POF) and the shape is not limited to a cylindrical shape as described above. The fiber ribbon 30 transmits light input to the core 41 from one end of the optical fiber line 40 by total reflection and outputs the light to the other end.

As shown in FIG. 1, light is transmitted in a direction from Y1 to Y2 and although the fiber ribbon 30 on the Y1 side includes four optical fiber lines 40, light is transmitted to only one core 41 of the optical fiber line 40 connected to the core 12a of the optical waveguide section 12.

A glass block 50 holding down the ends of the optical fiber lines 40 fitted in the alignment grooves 14b is bonded to the optical waveguide chip 10 and fixes the optical fiber lines 40 to the optical waveguide chip 10.

Figure 3:
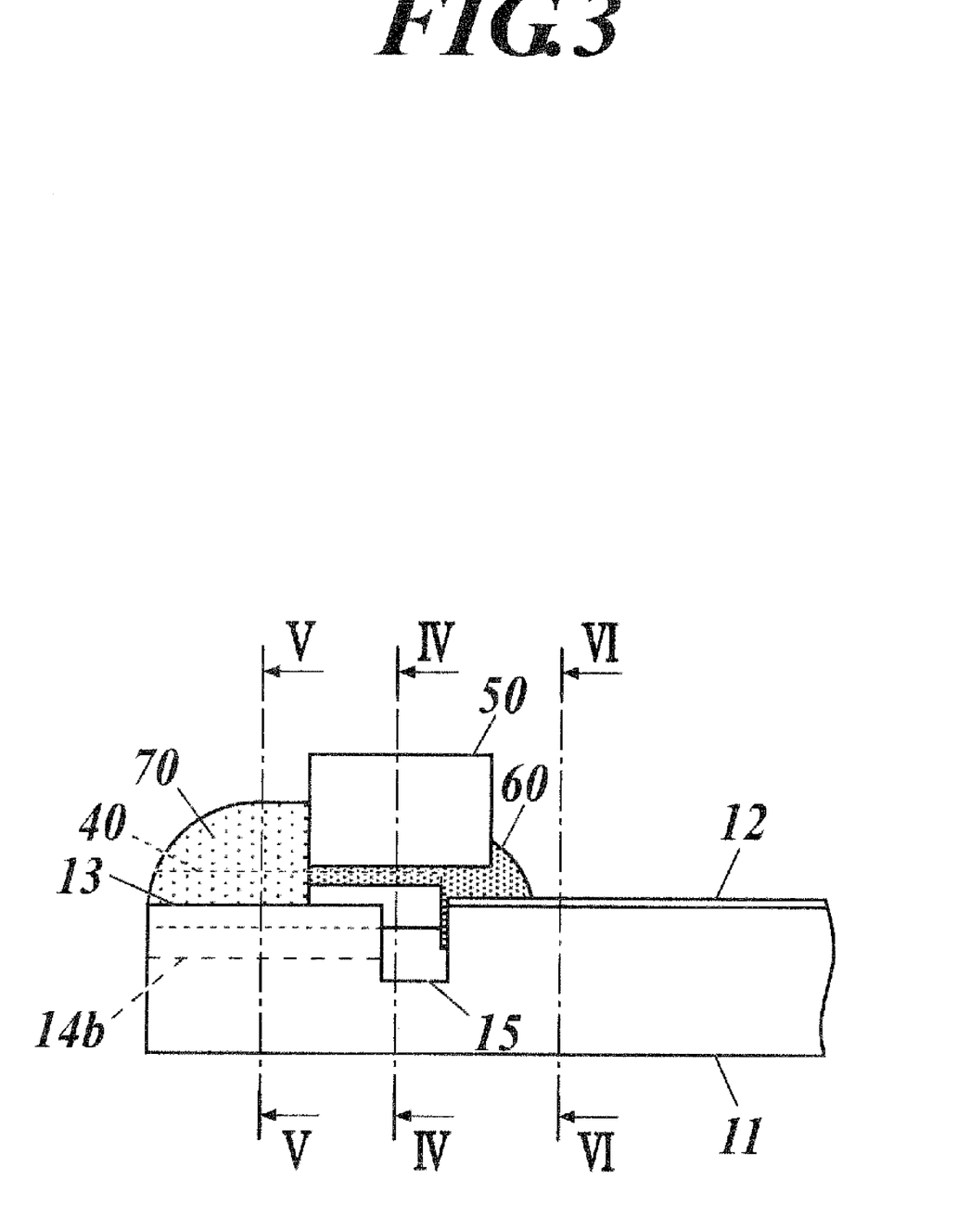
FIG. 3 is a side view showing an optical fiber line 40 fixed in an optical waveguide chip 10.
Figure 4:
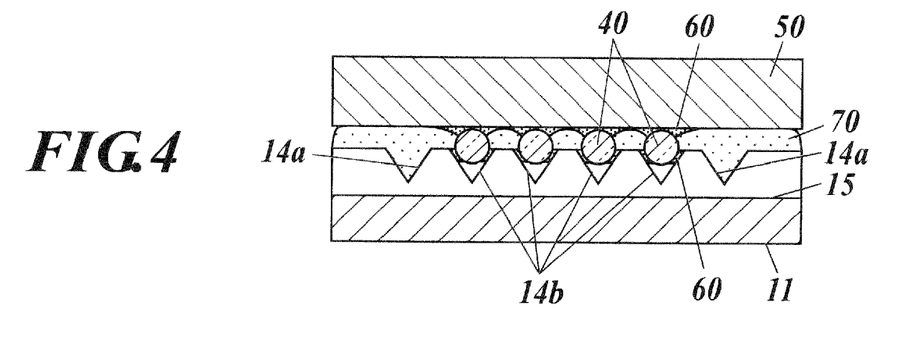
FIG. 4 is a cross-sectional view showing a cross-section taken along IV-IV shown in FIG. 3.
Figure 5:
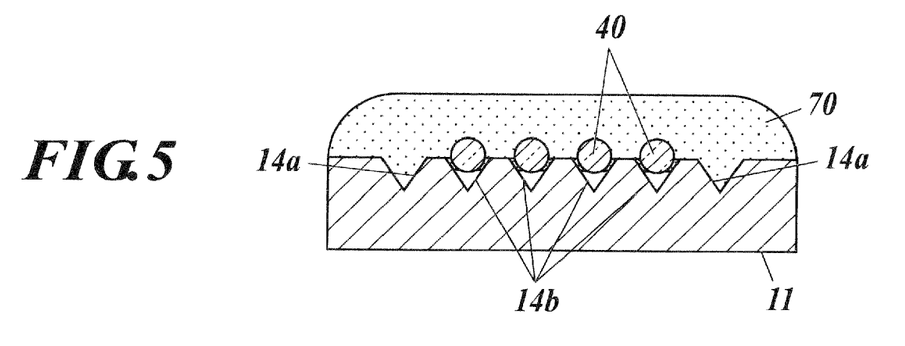
FIG. 5 is a cross-sectional view showing a cross-section taken along V-V shown in FIG. 3.
Figure 6:
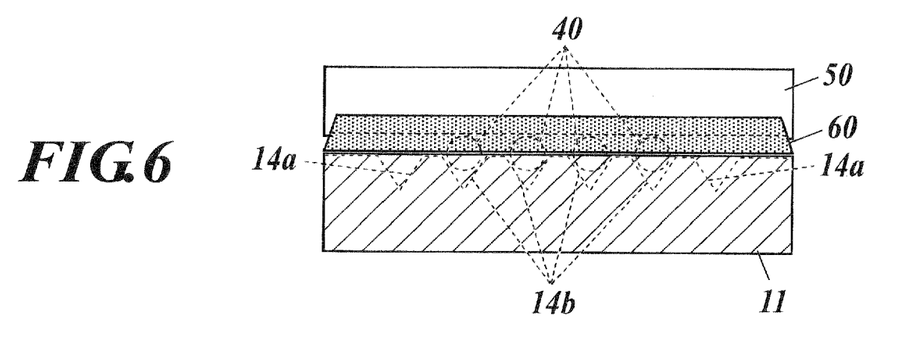
FIG. 6 is a cross-sectional view showing a cross-section taken along VI-VI shown in FIG. 3.

FIG. 3 is a side view showing an optical fiber line 40 fixed on an optical waveguide chip 10, FIG. 4 is a cross-sectional view showing a cross-section taken along IV-IV shown in FIG. 3, FIG. 5 is a cross-sectional view showing a cross-section taken along V-V shown in FIG. 3, FIG. 6 is a cross-sectional view showing a cross-section taken along VI-VI shown in FIG. 3.

As shown in FIG. 3, the optical fiber line 40 is placed in the alignment groove 14b with the end face abutting the side wall of the rectangular groove 15 on the optical waveguide section 12 side. Here, the core 41 of the optical fiber line 40 is placed facing the core 12a of the optical waveguide section 12.

As shown in FIG. 3, the glass block 50 is placed on the optical fiber line 40. The face of the glass block 50 at the side of the optical waveguide section 12 extends toward the optical waveguide section 12 over the side wall of the rectangular groove 15 on the optical waveguide section 12 side.

An area near the abutting area between a bottom face of the glass block 50 and the optical fiber lines 40 is the later-described flow path through which a matching adhesive 60 flows by a capillary phenomenon.

The matching adhesive 60 and reinforcement adhesive 70 are used for fixing the optical fiber lines 40 to the optical waveguide chip 10.

UV curable resin, which cures with ultraviolet irradiation, and the like may be used as matching adhesive 60. The refractive index of the cured matching adhesive 60 is almost equal to the refractive index of the cores 41 of the optical fiber lines 40 and the cores 12a of the optical waveguide section 12. By injecting matching adhesive 60 between the cores 41 of the optical fiber lines 40 and the cores 12a of the optical waveguide section 12, the air gap between the cores 41 of the optical fiber lines 40 and the cores 12a of the optical waveguide section 12 may be prevented and consequently, Fresnel reflection loss may be prevented. With this, the cores 41 of the optical fiber lines 40 and the cores 12a of the optical waveguide section 12 may be optically connected As described below, the matching adhesive 60 is injected from a gap between a top face of the optical waveguide section 12 and the bottom face of the glass block 50, and a portion spreads to a gap between the end faces of the optical fiber lines 40 and the side wall of the rectangular groove 15 on the optical waveguide section 12 side, and the remaining adhesive moves along the abutting area between the optical fiber lines 40 and the bottom face of the glass block 50 toward the connecting section 13 and then along a surface of the optical fiber lines 40 to reach the alignment grooves 14b by the capillary phenomenon.

Here, it is preferable that the fluidity of the matching adhesive 60 is high, and it is preferable that the viscosity of the matching adhesive 60 is lower than that of the reinforcement adhesive 70 and that the viscosity is no more than 1000 CP. With an adhesive with a viscosity higher than 1000 CP (for example 3800 CP), mobility of the matching adhesive 60 moving by the capillary phenomenon along the abutting area between the optical fiber lines 40 and the bottom face of the glass block 50 becomes slow, and the matching adhesive 60 flows into the rectangular groove 15.

With ultraviolet irradiation on the matching adhesive 60, the optical fiber lines 40 and the optical waveguide section 12, the optical fiber lines 40 and the alignment grooves 14b, and the optical fiber lines 40 and the glass block 50 are bonded.

The reinforcement adhesive 70 bonds the connecting section 13, which nips the optical fiber lines 40, and the glass block 50. By bonding using the reinforcement adhesive 70, the adhesion among the connecting section 13, the optical fiber lines 40 and the glass block 50 may be made even stronger, and mechanical strength may be enhanced.

As described below, the reinforcement adhesive 70 is dropped on top of the connecting section 13 from the side of the glass block 50 at the side of the connecting section 13 and injected in a gap between the top face of the connecting section 13 and the bottom face of the glass block 50.

It is preferable that the fluidity of the reinforcement adhesive 70 is low, and it is preferable that the viscosity of the reinforcement adhesive 70 is higher than that of the matching adhesive 60 and that the visocity is no less than 12000 CP. With an adhesive with a lower viscosity than 12000 CP, mobility of the reinforcement adhesive 70 becomes fast, and the reinforcement adhesive 70 flows into the rectangular groove 15.

In the following, a method of fixing the optical fiber lines 40 to the optical waveguide chip 10 will be described.

First, the optical fiber lines 40 are fitted into the alignment grooves 14b, and the ends of the optical fiber lines 40 abut the side wall of the rectangular groove 15 on the optical waveguide section 12 side.

Next, the glass block 50 is placed on the optical fiber lines 40 so that the face of the glass block 50 at the side of the optical waveguide section 12 extends toward the optical waveguide section 12 over the rectangular groove 15.

Next, as shown in FIG. 3 and FIG. 6, using a microsyringe and the like, the matching adhesive 60 is dropped from the side of the glass block 50 at the side of the optical waveguide section 12 and injected in a gap between the top face of the optical waveguide section 12 and the bottom face of the glass block 50. As for the injected matching adhesive 60, a portion spreads in a gap between the end faces of the optical fiber lines 40 and the side wall of the rectangular groove 15 on the optical waveguide section 12 side by the capillary phenomenon and as shown in FIG. 4, the remaining adhesive moves along the abutting area between the optical fiber lines 40 and the bottom face of the glass block 50 by the capillary phenomenon toward the connecting section 13 to form a meniscus. The matching adhesive 60 moves along the surface of the optical fiber lines 40 and reaches to the alignment grooves 14b and as shown in FIG. 4 and FIG. 5, the adhesive also reaches the gaps between the alignment grooves 14b and the optical fiber lines 40.

Next, the matching adhesive 60 is irradiated with ultraviolet rays to bond the optical fiber lines 40 and the optical waveguide section 12, the optical fiber lines 40 and the alignment grooves 14b, and the optical fiber lines 40 and the glass block 50.

Next, as shown in FIG. 3 to FIG. 5, the reinforcement adhesive 70 is dropped on the top of the connecting section 13 from the side of the glass block 50 at the side of the connecting section 13 and the adhesive is infected in the gap between the top face of the connecting section 13 and the bottom face of the glass block 50. Here, the reinforcement adhesive 70 fills the spaces between the plurality of optical fiber lines 40 and the spaces of the fixing grooves 14a on both sides in which optical fiber lines 40 are not placed.

With curing of the reinforcement adhesive 70, the connecting section 13, which nips the optical fiber lines 40, and the glass block 50 are bonded. With this, the optical waveguide device 1 is completed.

In the above-described optical waveguide device 1, by the capillary phenomenon, excess matching adhesive 60 moves along the abutting area between the optical fiber lines 40 and the bottom face of the glass block 50 toward the connecting section 13, consequently preventing the adhesive from flowing into the rectangular groove. Thus, it can be suppressed that the ends of the optical fiber lines 40 move by curing contraction and thermal expansion of the matching adhesive 60. As a result, the deterioration of alignment accuracy can be prevented.

Since the glass block 50 is fixed to the optical waveguide chip 10 across the rectangular groove 15, by bonding the ends of the optical fiber lines 40 to the bottom face of the glass block 50 with the matching adhesive 60, the movement of the ends of the optical fiber lines 40 can be suppressed.

In the following, an embodiment of the present invention will be described in detail with a specific example

[1] Width of Rectangular Groove

As the width of the rectangular groove becomes wider, the optical fiber lines placed on the rectangular groove 15 becomes longer, and thus the following of the optical fiber lines to the V-grooves may degrade and the alignment accuracy may deteriorate. In order to obtain an optimum width of the rectangular groove, the insertion loss was measured with different widths of the rectangular groove.

Eight optical fiber lines were connected to an optical waveguide section including cores with eight ports and the insertion loss was measured. The widths of the rectangular groove were set to 160 μm, 360 μm, 560 μm and 760 μm. In the measurement of the insertion loss, silicon-containing matching oil suitable to a refractive index of the optical fiber lines and the cores of the optical waveguide section was used.

Figure 7:
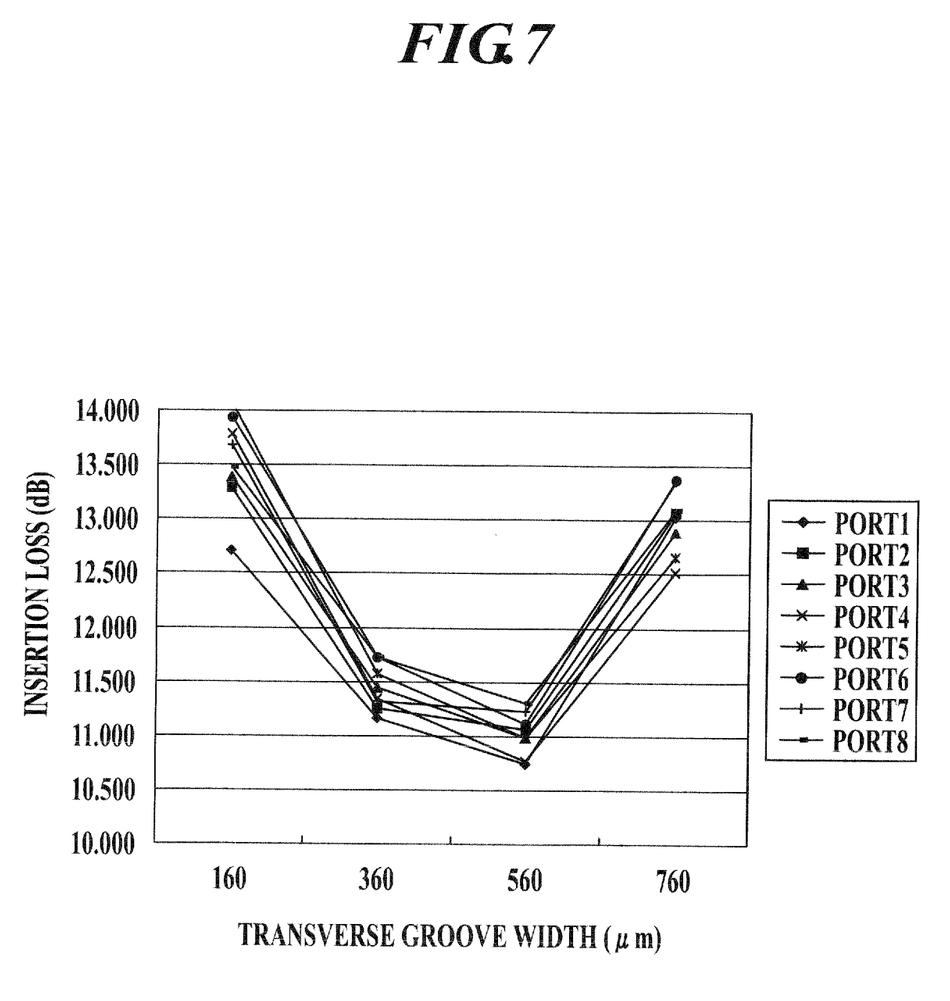
FIG. 7 is a graph showing a relationship between a width of a rectangular groove and insertion loss measured in port 1 to port 8.

FIG. 7 is a graph showing a relation between a width of a rectangular groove and insertion loss measured in port 1 to port 8. In all ports 1 to 8, among the widths 160 μm, 360 μm, 560 μm and 760 μm of the rectangular groove, the insertion loss was the smallest in the rectangular groove with the width of 560 μm.

The reason why the insertion loss is high when the width of the rectangular groove is smaller than 560 μm is thought to be because when a polymer material, which is to be the core and the clad, is applied by spin coating, the film thickness of the core and the clad of the surrounding area becomes thinner than the designed value and thus the position of the center of the core does not match with the optical fiber line aligned in a normal position. Thus, it is preferable that the width of the groove is wide so that the alignment with the optical fiber line is performed at the portion where the film thickness is even.

However, when the width of the rectangular groove becomes larger than 560 μm, an unfixed portion of the optical fiber line increases and the optical fiber line cannot be aligned at the correct position. Consequently, it is determined that implementation is difficult

[2] Position of Glass Block

Next, the insertion loss was measured by actually fabricating an optical waveguide device with a glass block bonded to an optical waveguide chip in different positions using matching adhesive instead of matching oil as well as reinforcement adhesive.

First Embodiment

V-grooves and a rectangular groove were formed on an optical waveguide chip with an optical waveguide section including cores with eight ports.

A length of a connecting section (length of the V-groove) was 7 mm and a width of the V-groove was 127 μm.

A diameter of the optical fiber line was 250 μm.

A width of the rectangular groove was 460 μm and a depth was 250 μm.

A length of the glass block was 5 mm and a thickness was 1 mm.

The glass block was placed with the face of the glass block at the side of the optical waveguide section protruding 200 μm toward the optical waveguide section. As matching adhesive, 2 μL of UV curable resin with a viscosity of 450 CP was injected with a microsyringe from the optical waveguide section side of the glass block in a gap between the bottom face of the glass block and the top face of the optical waveguide section and the resin was cured with ultraviolet irradiation.

Also, reinforcement adhesive with a viscosity of 12000 CP was injected from the connecting section side of the glass block in a gap between the bottom face of the glass block and the top face of the connecting section to form an optical waveguide device

FIRST COMPARATIVE EXAMPLE

A length of a connecting section (length of the V-groove) was 7 mm and a width of the V-groove was 127 μm.

A diameter of the optical fiber line was 250 μm.

A width of the rectangular groove was 460 μm and a depth was 250 μm.

A length of the glass block was 5 mm and a thickness was 1 mm.

The glass block is placed with the face of the glass block at the side of the optical waveguide section placed in the position of the side wall of the rectangular groove on the connecting section side. As matching adhesive, 2 μL of UV curable resin with a viscosity of 450 CP was injected with a microsyringe in a gap between the end faces of the optical fiber lines 40 and the side wall of the rectangular groove 15 on the optical waveguide section 12 side and the resin was cured with ultraviolet irradiation.

Also, reinforcement adhesive with a viscosity of 12000 CP was injected from the connecting section side of the glass block in a gap between the bottom face of the glass block and the top face of the connecting section to form an optical waveguide device.

The insertion loss of the two above-described optical waveguide devices were measured (1) when UV curable resin is supplied, (2) after the UV curable resin is exposed to ultraviolet radiation and cured (when UV curing ends), (3) after aging in 85° C. for one hour, and (4) after subjected to high temperature and high humidity test in a temperature of 85° C. and relative humidity of 85%.

Figure 8:
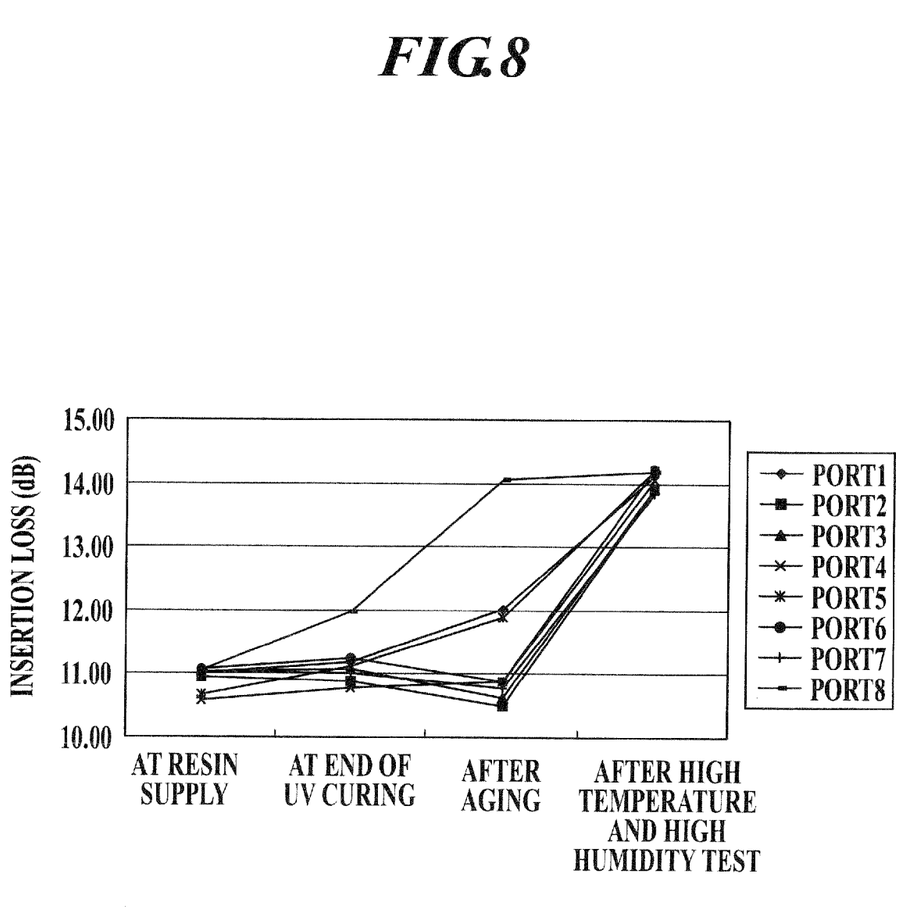
FIG. 8 is a graph showing insertion loss measured in port 1 to port 8 of an optical waveguide device of a first comparative example (1) when UV curable resin is supplied, (2) when UV curing ends, (3) after aging, (4) after subjected to high temperature and high humidity test.

FIG. 8 is a graph showing insertion loss measured in port 1 to port 8 of an optical waveguide device of a first comparative example (1) when UV curable resin is supplied, (2) when UV curing ends, (3) after aging, (4) after subjected to high temperature and high humidity test.

When UV curable resin was supplied, a similar attribute to matching oil was obtained, however, as the UV curing starts, the loss began to increase and after the UV curing ended, the loss increased 0.1 to 1 dB than the initial loss. With the following aging, the loss further increased, and after the high temperature and high humidity test, the loss in all ports drastically increased to 3 dB.

A reason for this increase of loss is thought to be because the end of the optical fiber line moves by the curing contraction of the UV curable resin Also, it is though that since the UV curable resin which flows into the rectangular groove expands when the resin is heated in the aging and high temperature and high humidity test, the end of the optical fiber line moves.

Figure 9:
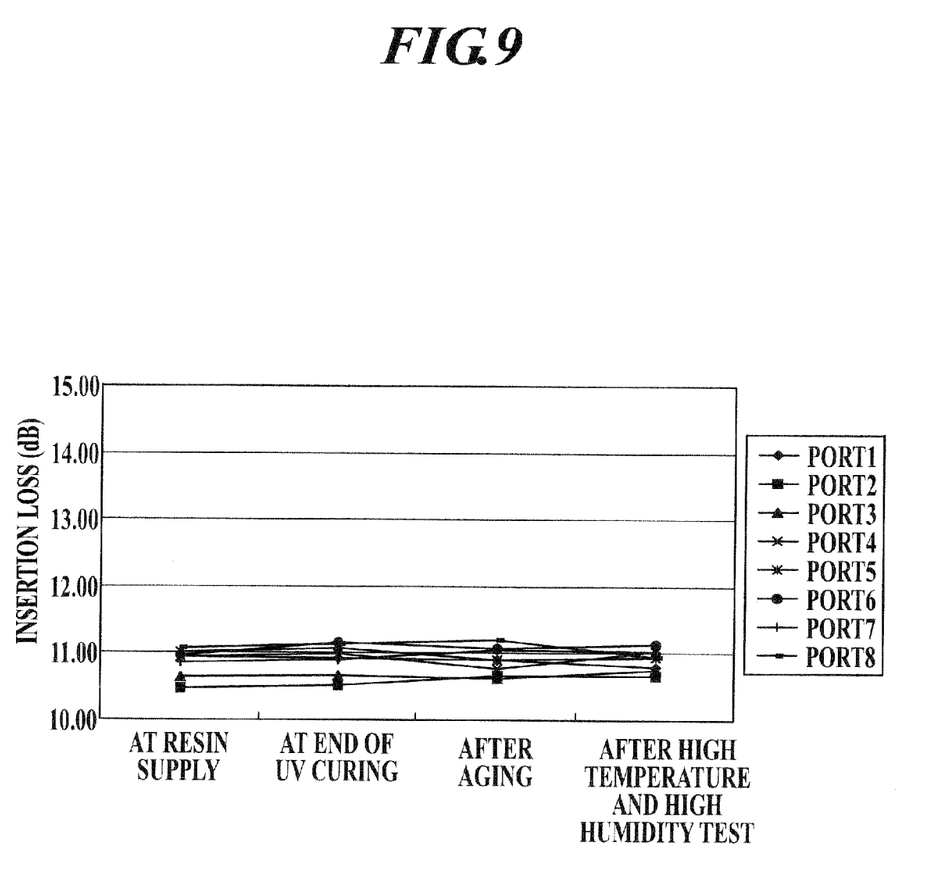
FIG. 9 is a graph showing insertion loss measured in port 1 to port 8 of an optical waveguide device of a first embodiment (1) when UV curable resin is supplied, (2) when UV curing ends, (3) after aging, (4) after subjected to high temperature and high humidity test.

FIG. 9 is a graph showing insertion loss measured in port 1 to port 8 of an optical waveguide device of a first embodiment (1) when UV curable resin is supplied, (2) when UV curing ends, (3) after aging, (4) after subjected to high temperature and high humidity test.

When UV curable resin was supplied, a similar attribute to matching oil was obtained, and variation of loss in all ports was suppressed to 0.25 dB or less after the UV curing ended, after aging and after subjected to high temperature and high humidity test.

The reason why it was possible to reduce the variation of loss is thought to be because, since the excess UV curable resin moves to the connecting section side along the abutting area between the optical fiber lines and the bottom face of the glass block by the capillary phenomenon, the flowing into the rectangular groove may be prevented and the curing contraction and heat expansion of the UV curable resin may be suppressed.

The above-described optical waveguide device 1 may be used in a splitter for an optical communication device, wavelength multiplexer/demultiplexer, switch and the like, however, use is not limited to these products and the optical waveguide device 1 may be used in any product including an optical fiber.

According to an aspect of the preferred embodiments of the present invention there is provided an optical waveguide device, comprising:

a substrate including an optical waveguide and a connecting section formed on at least one end of the optical waveguide;

an optical fiber placed in the connecting section and optically connected to the optical waveguide; and a fixing member to nip the optical fiber between the connecting section and the fixing member; wherein on the substrate, a groove is formed between the optical waveguide and the connecting section; and the fixing member is provided across the groove.

Preferably, in the optical waveguide device, the optical fiber is bonded to the fixing member above the groove by an adhesive.

Preferably, in the optical waveguide device, the adhesive to bond the optical fiber and the fixing member is injected from a gap between the optical waveguide and the fixing member.

Preferably, in the optical waveguide device, the adhesive is filled in a gap between the optical fiber and the optical waveguide, and optically connects the core of the optical fiber and the core of the optical waveguide.

Preferably, in the optical waveguide device, the adhesive has a viscosity of 1000 CP or less.

Preferably, in the optical waveguide device, the fixing member and the connecting section are bonded with a reinforcement adhesive with a higher viscosity than the adhesive.

Preferably, in the optical waveguide device, in the connecting section, an alignment groove is provided to place the optical fiber in a position to optically connect to the optical waveguide, and a fixing groove into which the reinforcement adhesive flows is provided parallel to the alignment groove.

According to these aspects, the inflow of the UV curable resin into the rectangular groove may be prevented and the alignment accuracy of the optical fiber line may be maintained.

The entire disclosure of Japanese Patent Application No. 2007-162624 filed on Jun. 20, 2007 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An optical waveguide device, comprising:
a substrate including an optical waveguide, a connecting section formed at at least one end of the optical waveguide, and a groove formed between the optical waveguide and the connecting section;
an optical fiber placed in the connecting section and optically connected to the optical waveguide; and
a fixing member to nip the optical fiber between the connecting section and the fixing member;
wherein the fixing member is provided across the groove such that the fixing member is provided on the connecting section and on the optical waveguide, and wherein the fixing member is provided on only a part of a top surface of the connecting section and is provided on only a part of a top surface of the optical waveguide.

2. The optical waveguide device according to claim 1, wherein the optical fiber is bonded to the fixing member above the groove by an adhesive.

3. The optical waveguide device according to claim 2, wherein the adhesive to bond the optical fiber and the fixing member is injected from a gap between the optical waveguide and the fixing member.

4. The optical waveguide device according to claim 2, wherein the adhesive is filled in a gap between the optical fiber and the optical waveguide, and optically connects a core of the optical fiber and a core of the optical waveguide.

5. The optical waveguide device according to claim 2, wherein the adhesive has a viscosity of 1000 CP or less.

6. The optical waveguide device according to claim 2, wherein the fixing member and the connecting section are bonded with a reinforcement adhesive with a higher viscosity than the adhesive.

7. The optical waveguide device according to claim 6, wherein in the connecting section, an alignment groove is provided to place the optical fiber in a position to optically connect to the optical waveguide, and a fixing groove into which the reinforcement adhesive flows is provided parallel to the alignment groove.

8. The optical waveguide device according to claim 1, wherein no grooves are provided in a bottom face of the fixing member that faces the connecting section and the optical waveguide.

9. An optical waveguide device, comprising:
a substrate including an optical waveguide and a connecting section formed at at least one end of the optical waveguide;
an optical fiber placed in the connecting section and optically connected to the optical waveguide; and
a fixing member to nip the optical fiber between the connecting section and the fixing member;
wherein on the substrate, a groove is formed between the optical waveguide and the connecting section;
wherein the fixing member is provided across the groove;
wherein the optical fiber is bonded to the fixing member above the groove by an adhesive; and
wherein the fixing member and the connecting section are bonded with a reinforcement adhesive with a higher viscosity than the adhesive.

10. The optical waveguide device according to claim 9, wherein in the connecting section, an alignment groove is provided to place the optical fiber in a position to optically connect to the optical waveguide, and a fixing groove into which the reinforcement adhesive flows is provided parallel to the alignment groove.

* * * * *